May 11, 1926. 1,584,080
F. P. DINKELBERG
APPARATUS AND METHOD FOR HANDLING AND STORING AUTOMOBILES
Filed August 12, 1922 8 Sheets-Sheet 7
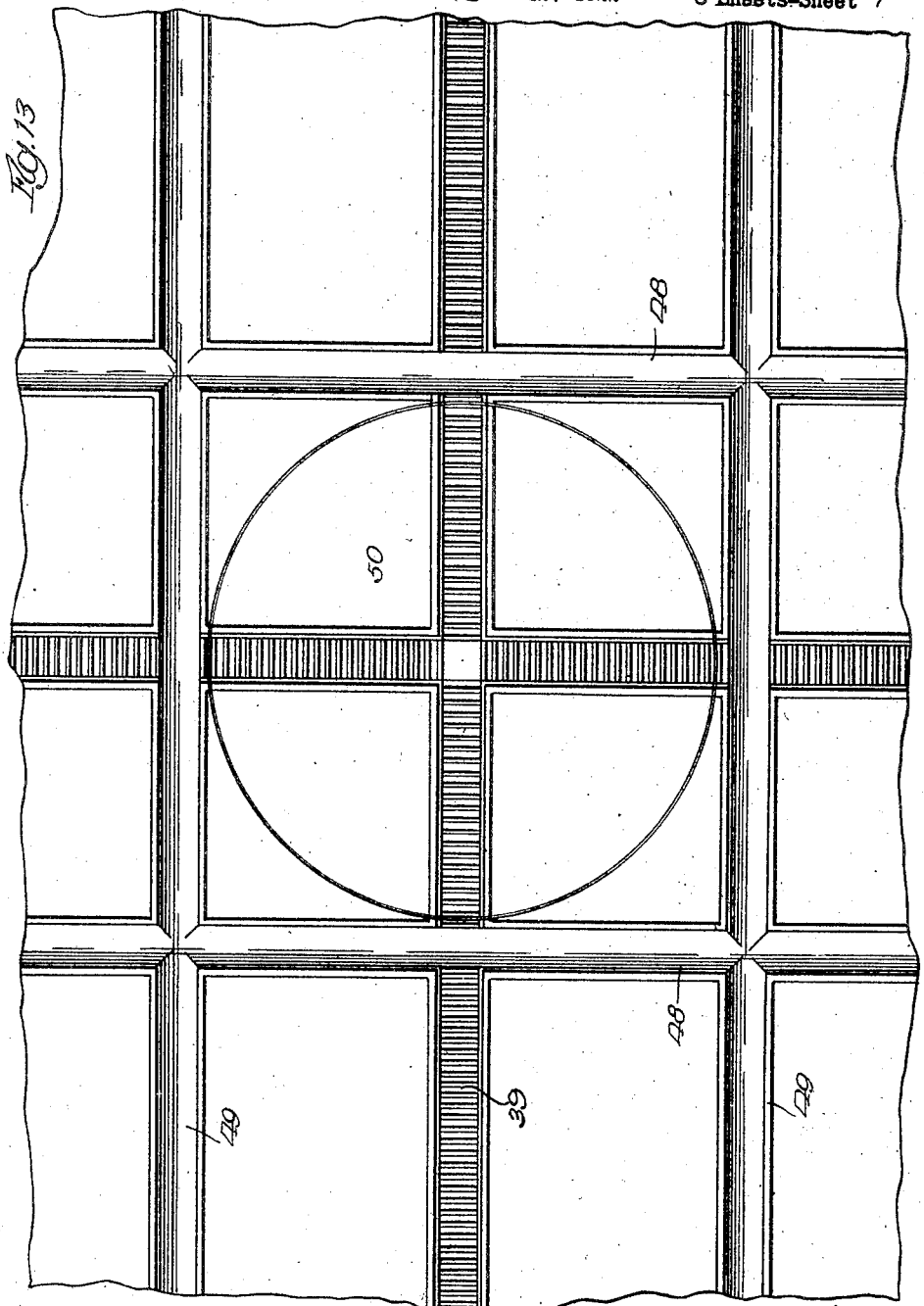

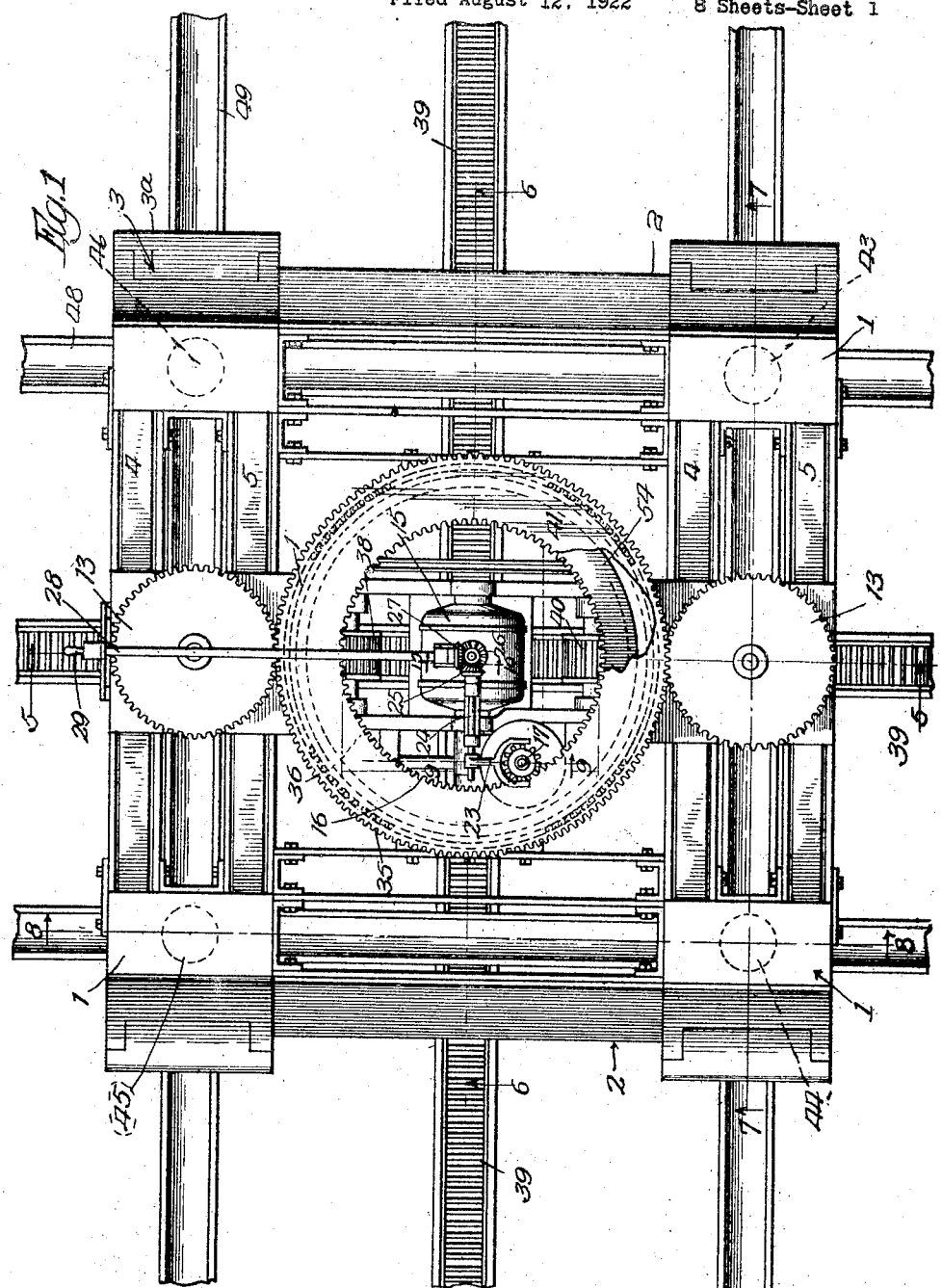

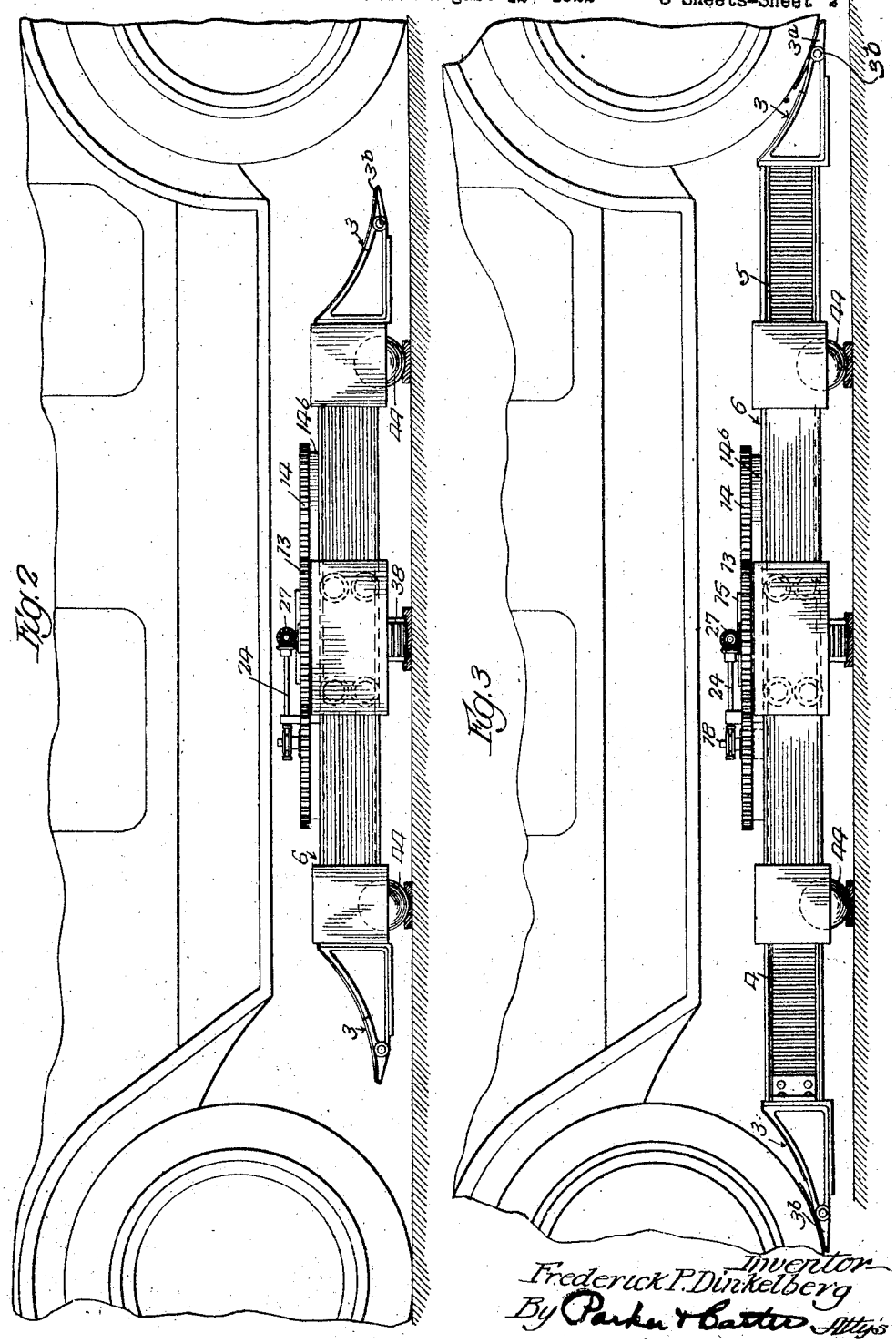

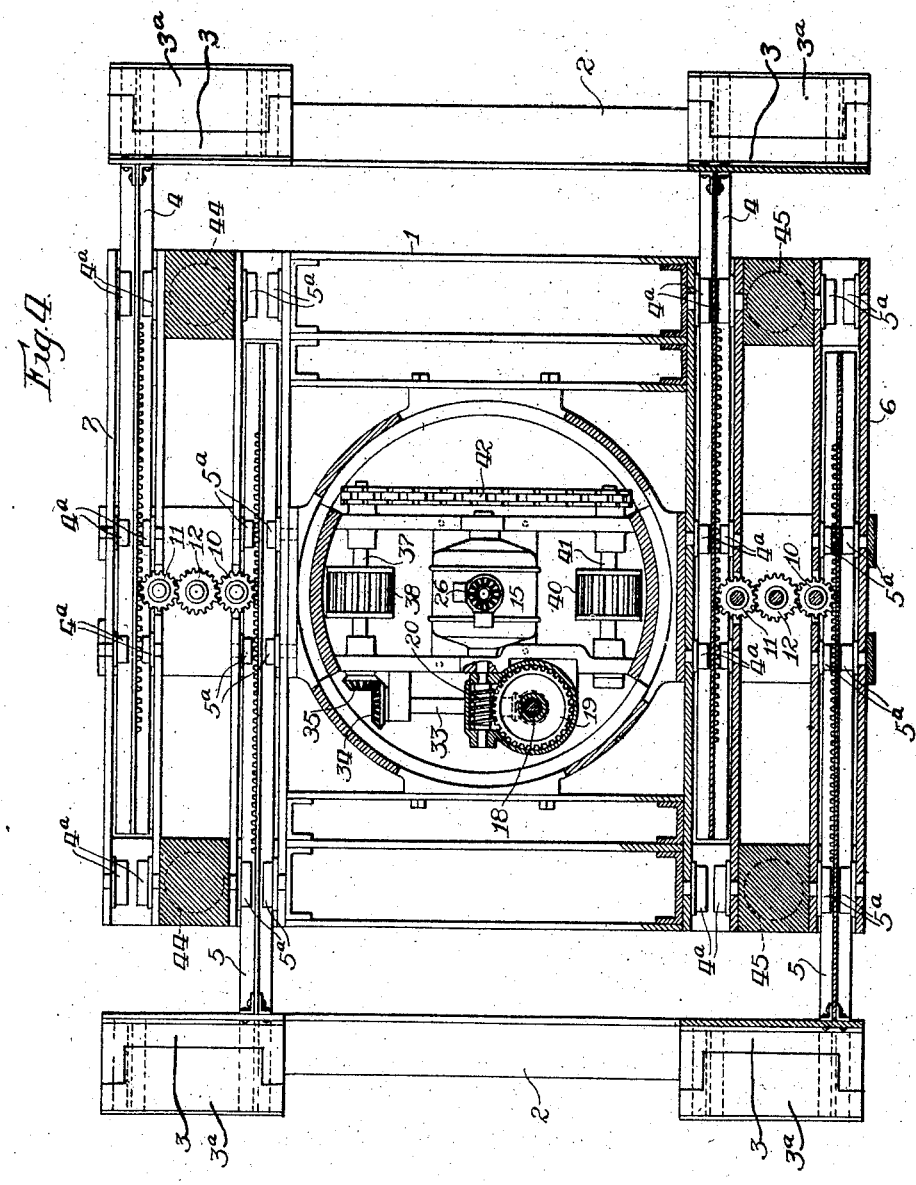

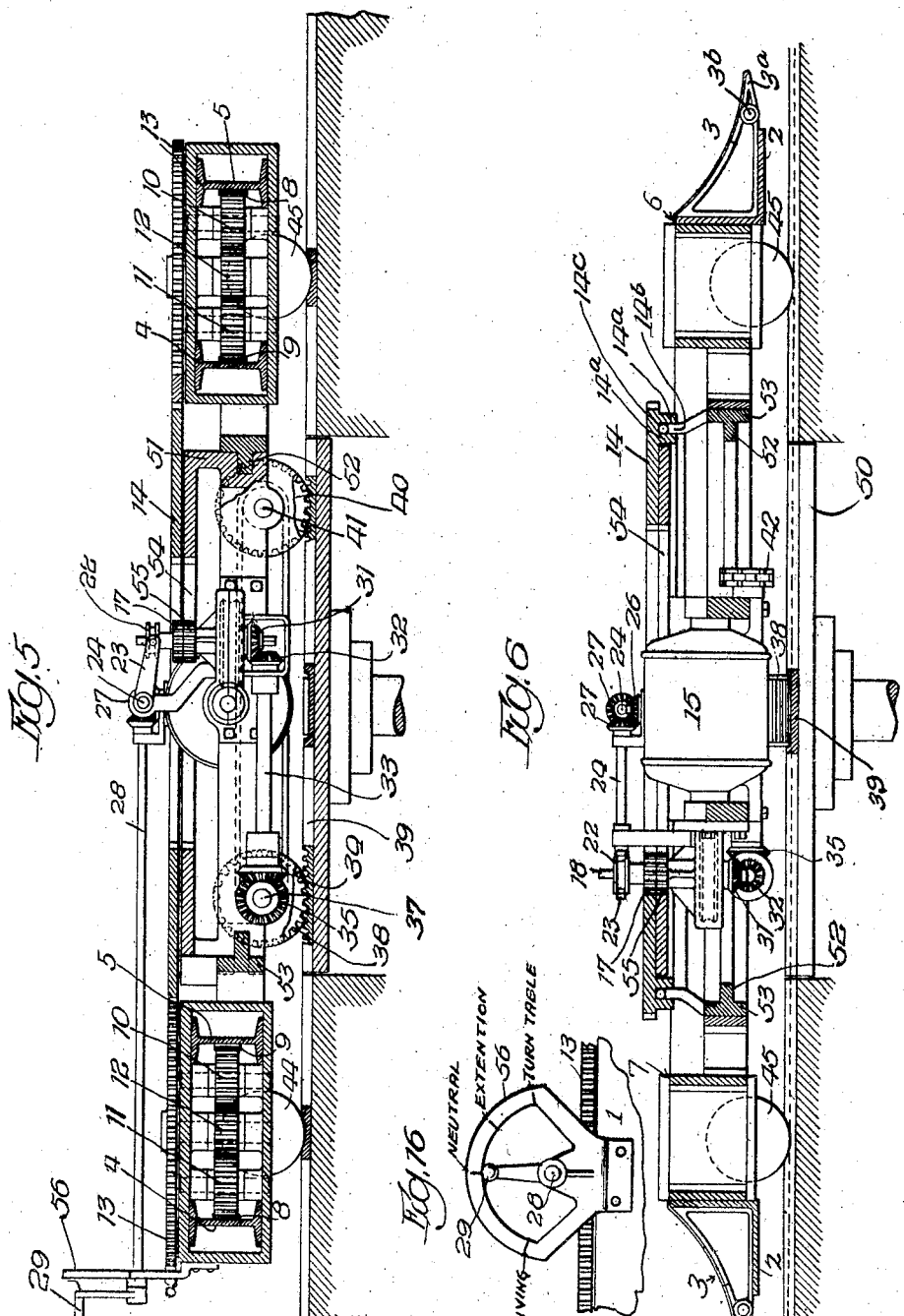

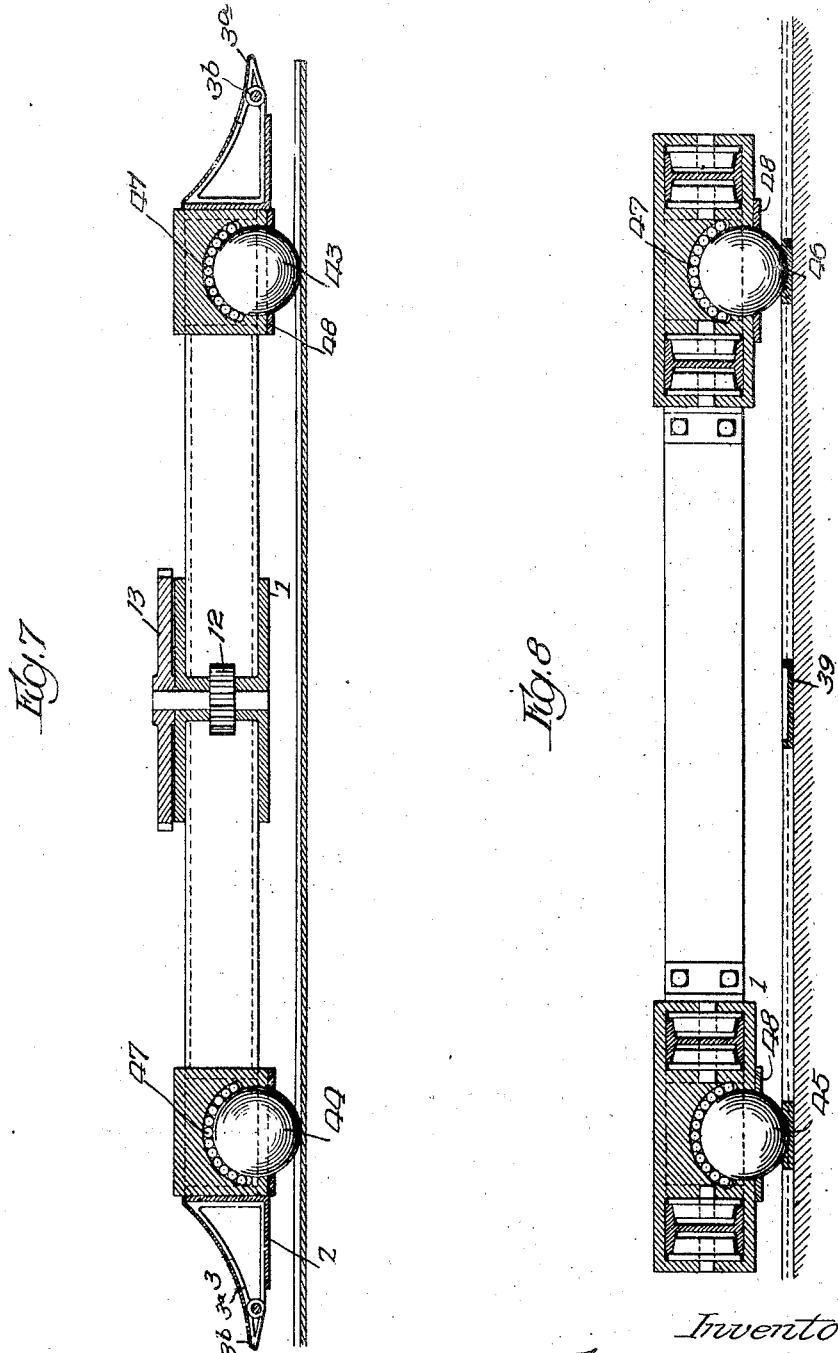

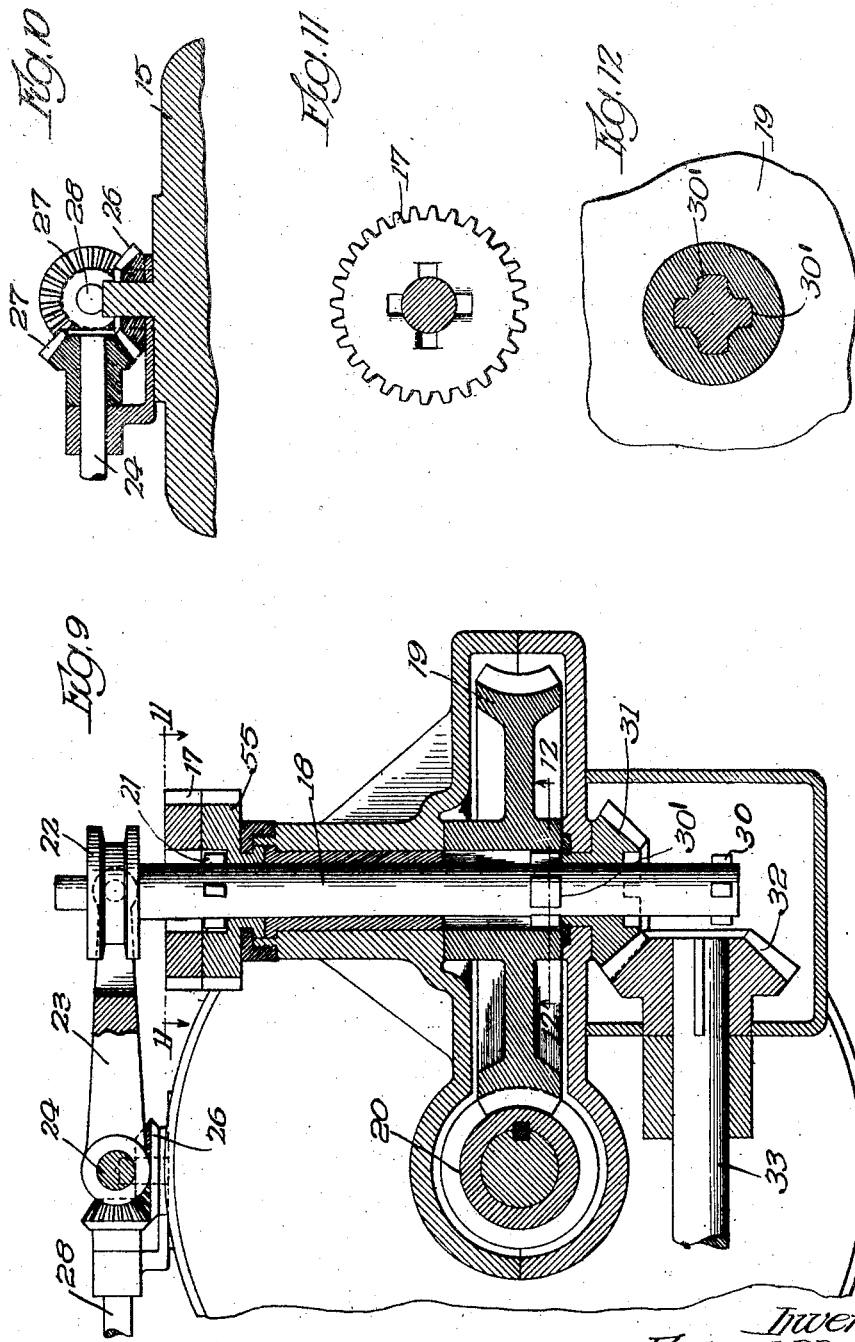

May 11, 1926.  
F. P. DINKELBERG  
1,584,080  
APPARATUS AND METHOD FOR HANDLING AND STORING AUTOMOBILES  
Filed August 12, 1922     8 Sheets-Sheet 8

Inventor:  
Frederick P. Dinkelberg,  
By Parker & Carter  
Attys.

Patented May 11, 1926.

1,584,080

UNITED STATES PATENT OFFICE.

FREDERICK P. DINKELBERG, OF EVANSTON, ILLINOIS.

APPARATUS AND METHOD FOR HANDLING AND STORING AUTOMOBILES.

REISSUED

Application filed August 12, 1922. Serial No. 581,548.

The question of handling and storing automobiles within a building and with profit to the owner of the building has become quite a serious proposition because it has heretofore been necessary to provide not only space for storage purposes but an entrance and an exit passage must also be provided to enable the driver to drive in and out and also manipulate the car so as to drive in or back into the allotted space. Such an operation not only requires skillful manipulation on the part of the driver, but to turn the automobile around, which is sometimes necessary, especially when the entrance is also used as the exit, or for other reasons, any driver other than an expert requires a space of a radius at least greater than twice the length of the car. If a driveway is employed extending around the inside of the building, considerable valuable space is lost for storage purposes. Heretofore with the prior methods of storing automobiles it is impossible to place two or more rows of cars side by side or in front of each other by moving the cars sidewise, but to store them necessitates turning or switching the cars and gradually working them into the allotted space. This operation requires time and labor with the attendant possibility of scratching and marring the adjacent cars. Furthermore to remove an inner car under the prior modes of storage necessitates the removal or shifting of a number of the surrounding cars to permit access to the desired car.

It is one of the objects of the present invention to overcome these difficulties and objections and to provide an improved method of storing automobiles in a building, so that a large number of automobiles may be kept in a given floor area, and to provide an improved apparatus for storing them by means of the use of which the car or automobile may be moved into any position desired, either forward or backward or laterally without turning the car, thereby not only economizing in space but the heretofore necessary wide driveways and turning spaces will be dispensed with, at the same time the car may be placed in the allotted space and can be removed expeditiously and with a minimum amount of labor.

A further object is to provide an improved method of storing automobiles by means of the employment of which method the automobiles or cars may be compactly arranged and any car may be readily and bodily removed without interfering with the other cars and without necessitating the turning of the car which is being removed or stored and during such removal or during the placing of the car in storage position.

The invention has other objects which are more particularly pointed out in the following description.

Referring, now, to the drawings,—

Fig. 1 is a plan view of one form of truck to be used in handling the automobiles;

Fig. 2 is a view showing the truck in position under the automobile and before being brought into engagement therewith;

Fig. 3 is a view similar to Fig. 2, showing the engaging ends of the truck moved under the wheels of the automobile so as to lift it;

Fig. 4 is a sectional plan view of the truck showing the wheel-engaging parts moved outwardly;

Fig. 5 is a sectional view taken on line 5—5 of Fig. 1;

Fig. 6 is a sectional view taken on line 6—6 of Fig. 1;

Fig. 7 is a sectional view taken on line 7—7 of Fig. 1;

Fig. 8 is a sectional view taken on line 8—8 of Fig. 1;

Fig. 9 is a sectional view taken on line 9—9 of Fig. 1;

Fig. 10 is a sectional view taken on line 10—10 of Fig. 1;

Fig. 11 is a sectional view taken on line 11—11 of Fig. 9;

Fig. 12 is a sectional view taken on line 12—12 of Fig. 9;

Fig. 13 is an enlarged plan view of the track intersections showing the turntable;

Fig. 16 is a view showing the handle and indicator.

Like numerals refer to like parts throughout the several figures.

Figure 14:
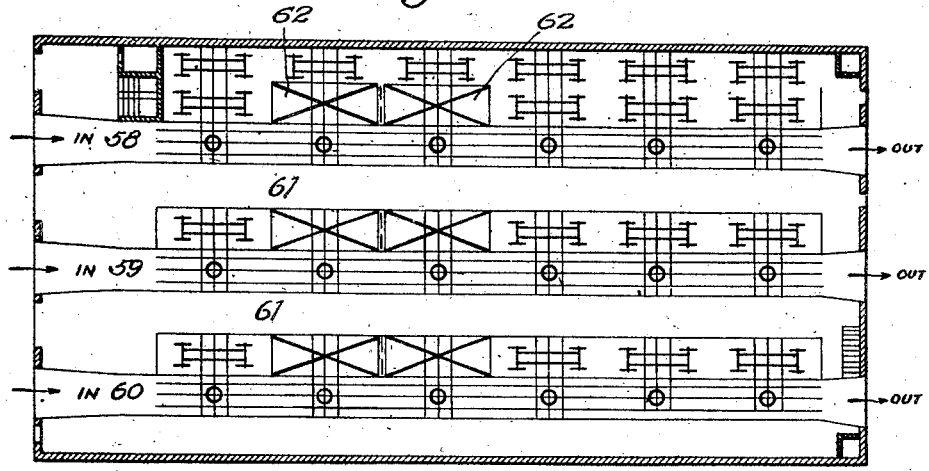
Fig. 14 is a first floor plan of one form of building in which the automobiles are stored.

In carrying out my invention I provide a truck which can be placed under the automobile, the ends of the truck then being moved outwardly to engage the wheels and as a result of a further pressure of the wheel engaging portions of the truck against the peripheries of the automobile wheels, the automobile will be lifted from the ground or the surface upon which its wheels rest, whereupon the automobile can then be easily and quickly moved to any point desired either forward or backward or sidewise.

Referring now to the drawings, I have shown in Figs. 1 to 8, inclusive, one form of truck for this purpose. This truck must be low so as to go under the automobile, and must also be strong and capable of easy handling. In the construction shown the truck is provided with a main frame or body portion 1, upon which is mounted the movable end portions 2. These end portions have wheel-engaging parts 3 and means is provided for moving these wheel-engaging parts under the wheels after the truck is placed under the automobile. The wheel-engaging parts preferably have inclined upper faces, and I also prefer to provide them with pivoted wheel-engaging parts 3ª pivoted at 3ᵇ (see Fig. 7). These parts may then move down when they engage the wheels, so as not to injure the tires as the wheel-engaging parts are pushed under the wheels. These pivoted parts are desirable because of the fact that the wheel-engaging parts 3 must be above the floor so as to lift the automobile a sufficient height to clear the floor. In the construction shown, the movable end portions are provided with the supporting and controlling arms 4 and 5, which are supported upon the main frame 1 so as to slide therealong. This main frame 1 may be made up in any desired form or shape. As herein shown, it has the two side members 6 and 7. These side members have suitable receiving spaces in which are received the supporting and controlling arms 4 and 5. Some suitable mechanism is provided for moving these arms in and out as desired, said arms moving on the friction rollers 4ª 5ª.

As herein shown, the arms 4 are provided with racks 8 and the arms 5 with racks 9. Pinions 10 engage the teeth 8 of supports 4, and the pinions 11 engage the teeth 9 of supports 5. These pinions mesh with a gear 12 arranged so that, as the gear 12 is rotated, the pinions 10 and 11 will be rotated in opposite directions, so as to move the arms 4 and 5 in opposite directions (see Figs. 4 and 5). The gears 12 are operatively connected with the gears 13 (see Figs. 1 and 5). The gears 13 mesh with a central gear 14, which is operatively connected with the motor 15. In the construction shown, the gear 14 has internal teeth 16 forming an internal gear, and this internal gear engages the pinion 17 (see Figs. 1 and 9). The pinion 17 is adapted to be connected to a shaft 18 operatively connected with the motor shaft in any suitable manner, as by means of the worm wheel 19 and the worm 20. The worm wheel 19 is feathered to the shaft 18 by the keys 30' which work in grooves in the hub of the worm wheel so that the shaft 18 may be slid longitudinally with relation to the worm wheel 19 without disconnecting the worm wheel from the shaft 18.

Some suitable means is provided for connecting and disconnecting the mechanism, which moves the movable end pieces in and out, from the motor. In the construction herein shown this is accomplished by making the shaft 18 longitudinally movable with relation to the gear 17, such shaft being provided with an engaging projection or projections 21 (see Figs. 9 and 11), which fit into a suitable recess or recesses in the gear 17. When the shaft 18 is moved into the position shown in Figure 9, the projection or projections 21 will be disconnected from the gear 17 and the movable end or wheel engaging portions will be disconnected from the motor 15. If the shaft 18 is moved upwardly from the position shown in Figure 9 the projection or projections 21 will engage in the recesses of the gear 17 and thereby connect the movable end or vehicle wheel engaging portion of the truck with the motor.

The shaft 18 may be moved still further upwardly to cause the projection or projections 21 to again pass out of engagement with and into a position above the gear 17, at which time the beveled gear 31, to be hereinafter described, will be connected with the motor 15.

The shaft 18 may be controlled in any desired manner. As herein shown, this shaft is rotating wherever the motor is rotating, and is feathered to the worm wheel 19 so that it may be slid back and forth in the hub of such worm wheel while both the worm wheel and the shaft 18 are rotating. As shown in Fig. 9, there is a grooved collar 22 connected to the shaft 18. This grooved collar is engaged by a forked arm 23 (see Figs. 1 and 9). The forked arm is connected with a shaft 24, which carries a beveled gear 25 (see Fig. 1). This beveled gear engages a beveled gear 26 loosely mounted at the top of the motor and preferably at the vertical central axis of the gear 14. The beveled pinion 27 also engages the pinion 26 and is connected by a shaft 28 with a handle 29 placed at some accessible point, as at the side of the machine (see Figs. 1 and 5). It will be noted that when the handle 29 is rotated in one direction the shaft 28 will be rotated, and this will rotate the pinion 27 and the pinion 26 and the pinion 25, thus rotating the shaft 24, thereby moving the forked arm 23 up or down, depending on the direction of the movement of the handle, and this moves the shaft 18 up or down. When the shaft 18 is moved upwardly from the position shown in Figure 9 the projections 21 connect with the pinion 17, and if the motor is in operation this moves the movable end portions outwardly so as to cause them to be pushed under the wheels and lift the automobile, as shown in Fig. 3. After the automobile has been lifted, the handle 29 is rotated in a direction to move the shaft 18 still further upwardly so as to disconnect the projections 21 from the pinion 17, which latter movement will seat the projection or projections 30 on the shaft 18 (see Fig. 9) in the recess or recesses in the beveled pinion 31 loosely mounted on said shaft. This connects the motor with the driving mechanism, which moves the truck back and forth, this driving mechanism being as follows:
The beveled gear 31 engages a beveled gear 32 on the shaft 33 (see Figs. 4, 5 and 9). The shaft 33 has at its other end a beveled gear 34 which engages a beveled gear 35. The beveled gear 35 is connected with a shaft or axle 37 carrying a tooth or rack wheel 38, which engages a tooth part or rack 39 on the surface along which the truck is to be moved. I prefer, also, to provide another tooth or rack wheel 40 and a shaft or axle 41, which is connected by a suitable belt 42 with the axle 37. I prefer to use sprocket wheels on the axles and a chain belt, although any other form of driving connection can be used. It will thus be seen that when the shaft 18 is moved a sufficient distance upwardly (see Fig. 9) so as to engage the projection or projections 30 with the gear wheel 31, when the motor is in operation, there will be a driving connection to the tooth or rack wheels 38 and 40, such connection being through the gears 31 and 32, shaft 33, gears 34 and 35, axle 37, belt 42 and axle or shaft 41. Under these conditions the truck will be moved along the surface.
I prefer to provide the truck with wheels or rotatable parts so that it may roll easily along the surface. These may be wheels or of any other desired construction. In order to permit the truck to run easily in different directions, say forward and back and crosswise or laterally, I prefer to provide the truck at each corner with the balls 43, 44, 45 and 46. These balls are mounted in suitable sockets and are preferably provided with ball bearings 47. The balls are held in place by the holding pieces 48 (see Fig. 8), which preferably provide a snug fit and which also act to scrape off any material that may adhere to the balls. I also prefer to provide tracks 48 and 49 for the wheels of the truck, these tracks crossing each other at proper intervals wherever it is desired to move the automobile.

Some means is provided for transferring the truck from one track to another. I prefer to provide a means, for example, of transferring the truck from one track to another at an angle thereto without changing the relative position of the automobile, as it is important, in properly placing the automobiles in the building, to have them all in the same position. In the construction herein shown I secure this result by the following means: I provide in proximity to the intersection of the tracks a turntable 50. It will be noted that this turntable is smaller than the truck and that the truck itself is not placed upon the turntable. The turntable has the racks upon it, and when the truck is brought to the intersection of two tracks the rack wheels of the truck engage one of these racks. The motor 15 and associated parts of the truck are mounted upon a rotatable frame 51 (see Fig. 5), which is rotatably mounted in the main frame. The rotatable frame 51 is provided with recesses into which the supporting projection 52 on the stationary frame piece 53 projects. It will thus be seen that the frame 51, carrying the motor and associated mechanism, can be rotated on the stationary piece 53. This rotation may be produced in any desired manner, but I prefer to use the motor for this purpose and I have shown one mechanism for doing this. In this construction I provide a toothed part or wheel 54 (see Figs. 1, 5 and 6). This toothed part is located beneath the gear 14 and is connected with the rotating frame 51. The gear 14 preferably has guides 14$^a$ which engage projections 14$^b$ on the frame at intervals, and within these projections are preferably provided ball bearings 14$^c$. The toothed part 54 is engaged by a pinion 55 (see Figs. 5 and 9). This pinion is loosely mounted on the shaft 18 and is provided with an opening or openings for the projections 21 on the shaft 18. When it is desired to rotate the turntable, the handle 29 is turned until the shaft 18 is lowered so that the projections 21 engage the recesses in the pinion 55, as shown in Fig. 9, and the shaft 18 will be disconnected with respect to the gears 17 and 31. If, now, the motor is operated, the shaft 18 will be turned and this will turn the pinion 55, which by its engagement with the toothed part or wheel 54 will turn this part and also the rotatable frame 51. The engagement of the rack wheels with the racks will cause the turntable to be turned with the rotatable frame 51. I prefer to provide the racks with upwardly projecting parts at the side to insure this turn, as shown in Figs. 5 and 6. It will thus be seen that when it is desired to transfer the truck from one track to a track at an angle thereto it is only necessary to move the truck to the point where the wheels or balls will be opposite the tracks at an angle, and then move the handle 29 so as to connect the shaft 18 with the pinion 55, whereupon the frame with the motor and also the turntable will be rotated until the rack in engagement with the rack wheels is in alignment with the rack on the track at an angle. The pinion 55 can then be disconnected from the shaft by moving the handle 29 and the rotation of the parts stopped. In view of the fact that balls are used for wheels, it will be seen that when the motor is then started up to move the truck these balls will move along the track at an angle without the necessity of turning them for this purpose, the balls having, as it were, a universal movement.

The parts are preferably arranged so that the handle 29 can be moved to a position where neither the pinions 17 and 55 nor gear 31 will be connected with the shaft 18. I prefer, also, to provide an indicator 56 for the handle 29, which will be marked with the various positions into which the handle is to be moved, as shown, for example, in Fig. 16. This indicator, for example, would have marked on it the various positions of the handle, one being the position wherein the end pieces are moved outwardly to engage the wheels of the truck, another being the position of the handle when the truck is to be moved along the track, and another being the position of the handle when the turntable is to be rotated. It will thus be seen that when the turntable is rotated the motor and the rotatable frame will be rotated but the main frame of the truck will remain stationary, and the automobile, being supported upon the main frame, will also remain stationary and will always be in the same relative position regardless of the track upon which the truck moves, this position being parallel with the track upon which the truck rests when the automobile is placed upon it.

I have shown one means of driving the truck for purposes of illustration, but it is, of course, evident that any other suitable means may be used. I prefer, however, to use the racks and tracks, as this obviates the necessity of guiding the truck and insures the automobile always being moved safely and to the proper position.

Figure 15:
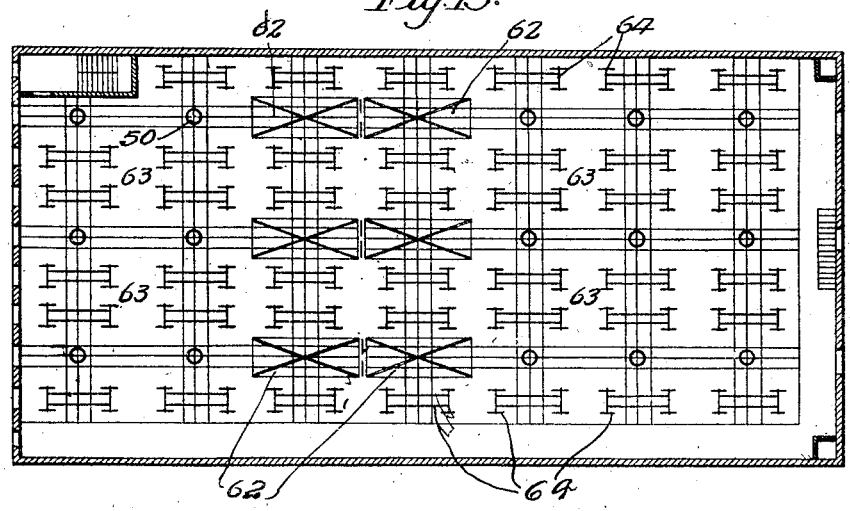
Fig. 15 is a typical upper story plan of the building of Fig. 14.

If, now, it is desired to store automobiles in a high building with a number of floors, this can be done in various ways. I have shown in Figs. 14 and 15 one particular construction for this purpose, in order to show the ease and accuracy with which the automobiles may be handled. In this construction I have shown a building having units of 25 feet, and in this particular construction there are three of these units. The building can be any desired width. In this construction there are driveways 58, 59 and 60, into which the automobiles are driven. At the side of these driveways are passenger landing platforms 61. At suitable intervals there are provided elevators 62. These elevators, in the particular construction shown, are arranged so that the automobiles may be bodily moved laterally or sidewise in and out both sides and also endwise out of one end of the elevator, the other ends of the adjacent elevators being preferably placed together so as to provide between them room for the counterweights of the elevators. It will be noted that while on the ground floor a certain portion of the floor is taken up by driveways and platforms, the upper floors, shown in Fig. 15, are free from any such driveways. There are, however, on the upper floors between the elevators, lengthwise of the building, the runways 63. When a machine is driven into the building on the lower floor it is run opposite one of the elevators and one of the trucks is then placed under it and the movable end portions moved out under the wheels to lift the automobile. The truck is then run onto the elevator, the elevator raised to the desired floor, and the truck then run off either endwise or sidewise, as the case may be, and the automobile moved to its proper storage place, the turntable being used wherever necessary for this purpose, there preferably being a turntable adjacent each intersection of the tracks. The truck is then removed from under it and moved back upon the elevator, and can then be again used. The automobiles may be placed upon the trucks at any point desired and the truck then run off the elevator, and the elevators and storage arrangements may be arranged to suit the conditions. It will be seen by examining Figs. 14 and 15 that any automobile, 64, in the building can be taken out and taken down the elevator without interfering with any of the other automobiles, and this regardless of the time when it is placed in its receiving space. This is due to the fact that although the automobiles are placed in the storage spaces side by side and also one in front of the other, the particular automobile desired may be removed by mounting the same upon the truck and moving the automobile sidewise, thereby dispensing with the necessity of turning the car and working the same out of the storage space.

The pivoted wheel-engaging parts on the movable end pieces have their pivots near the outer end, so that when the outer ends engage the automobile wheels they will tip down but when the wheels are in position upon them they will tip back so as to be in equilibrium, as shown in Fig. 3.

I have described in detail a particular construction embodying my invention, but it is, of course, evident that the parts may be varied in many particulars without departing from the spirit of my invention as embodied in the claims hereto appended, and I therefore do not limit myself to the particular construction shown.

It will be noted that by my method of storing automobiles I first take the automobiles and place them all in the same general position with their longitudinal center lines running in the same direction with relation to the building and then I transfer them to the various storage spaces on the various floors so that when they reach the storage space this longitudinal center line of all the automobiles is in the same relative position and in the same position as it was when the storage movement began.

I claim:

1. An apparatus for handling automobiles, comprising a truck, wheel engaging pieces connected with said truck and bodily movable with relation to said truck, and means for moving the pieces outwardly so as to cause them to project under the wheels of the automobile and lift it free of the surface on which it rests.

2. An apparatus for handling automobiles, comprising a truck, movable members connected with said truck, and means for moving the said members outwardly so as to cause them to project under the wheels of the automobile and lift it free of the surface on which it rests, said members provided with freely movable wheel-engaging parts adapted to move with relation to the said members so as to freely pass under the wheels of the automobile.

3. An apparatus for handling automobiles, comprising a truck, movable members connected with said truck, and means for moving the said members outwardly so as to cause them to project under the wheels of the automobile and lift it free of the surface on which it rests, said members having pivoted wheel-engaging parts by which they are connected to the said members, the pivots being near the outer ends of the wheel-engaging parts.

4. An apparatus for handling automobiles, comprising a truck, provided with a frame, movable members connected with said frame, means for moving the said members outwardly so as to cause them to project under the wheels of the automobile and lift it free of the surface on which it rests, means for driving the truck and means for changing the direction of movement of the truck while the relative position of the automobile upon it remains the same.

5. An apparatus for handling automobiles, comprising a supporting frame, wheels upon which it is supported, movable members connected to said frame, a rotatable frame mounted upon the supporting frame, a motor on the rotatable frame, and an operative connection between said motor and said members.

6. An apparatus for handling automobiles, comprising a supporting frame, wheels upon which it is supported, movable members connected to said frame, a rotatable frame mounted upon the supporting frame, a motor on the rotatable frame, an operative connection between said motor and said members, and means for rotating said rotatable frame while the motor and the movable members remain connected.

7. An apparatus for handling automobiles, comprising a supporting frame, wheels upon which it is supported, movable members connected to said frame, a rotatable frame mounted upon the supporting frame, a motor on the rotatable frame, an operative connection between said motor and said members, means for rotating said rotatable frame while the motor and the movable members remain connected, intersecting tracks upon which the truck runs, a turntable at the intersection of the tracks, and means for rotating the turntable and the rotating frame independently of the truck.

8. An apparatus for handling automobiles, comprising a supporting frame, wheels upon which it is supported, movable members connected to said frame, a rotatable frame mounted upon the supporting frame, a motor on the rotatable frame, an operative connection between said motor and said members, means for rotating said rotatable frame while the motor and the movable members remain connected, intersecting tracks upon which the truck runs, a turntable at the intersection of the tracks, racks associated with said tracks and said turntable, a rack wheel engaging said rack on the turntable when the truck is over it, and means for rotating the rotating frame upon the supporting frame so as to rotate the turntable to transfer the truck from one track to the other.

9. An apparatus for handling automobiles, comprising a truck adapted to be moved under the automobile, means associated with the truck for lifting the automobile from the ground and supporting it on the truck, said means embodying wheel engaging surfaces adjustable with relation to the truck, means for simultaneously adjusting a plurality of said surfaces with respect to the truck, and means for moving said truck to the storage place for the automobile and then disconnecting the automobile therefrom.

10. Apparatus for handling and storing automobiles, comprising a building, elevators for said building, intersecting tracks on the various floors of the building, tracks on said elevators registering with the tracks on the floor, turntables at the intersection of the intersecting tracks, racks extending along said tracks and across said turntables, a truck upon which the automobile is received working on said tracks and provided with driving means connected with said racks, the turntables being smaller than the trucks so as not to be engaged by the supporting wheels thereon, and means for rotating any given turntable when the truck is in proper relation thereto so as to transfer the truck from one track to another.

11. Means for handling and storing automobiles, comprising a building having a floor divided into storage spaces, a truck adapted to be moved under the automobile and having a frame, laterally moving members connected with said frame and adapted to be moved into engagement with the automobile wheels to lift them, and means for transferring said truck to any one of said storage spaces.

12. A method of storing automobiles which consists in placing the automobiles in a given position with their longitudinal center lines in a definite position with relation to the building, then transferring said automobiles to storage spaces and depositing them in the storage spaces with their longitudinal center lines all in substantially the same relative position.

13. A method of storing automobiles which consists in placing the automobiles in a given position with their longitudinal center lines in a definite position with relation to the building, then transferring said automobiles to the various storage spaces without changing during the transfer the relative position with relation to the building of the longitudinal center lines of said automobiles.

14. An apparatus for handling vehicles, said apparatus embodying a truck like structure adapted to be positioned under the vehicle, wheel engaging portions carried by the truck for movement therewith and with respect thereto, and means for moving the said wheel engaging portions with relation to the truck and into engagement with the vehicle wheels for elevating the vehicle and supporting the same by means of said truck.

15. An apparatus for handling vehicles, said apparatus embodying a wheel supported truck like structure adapted to be positioned under the vehicle, wheel engaging portions carried by the truck for movement therewith and with respect thereto, and means for moving the said wheel engaging portions with relation to the truck and into engagement with the vehicle wheels for elevating the vehicle and supporting the same by means of said truck.

16. An apparatus for handling vehicles, said apparatus embodying a truck like structure adapted to be positioned under the vehicle, wheel engaging portions carried by the truck for movement therewith and with respect thereto, means for moving the said wheel engaging portions with relation to the truck and into engagement with the vehicle wheels for elevating the vehicle and supporting the same by means of said truck, and driving mechanism for propelling the truck.

17. An apparatus for handling vehicles, said apparatus embodying a truck like structure adapted to be positioned under the vehicle, wheel engaging portions carried by the truck for movement therewith and with respect thereto, means for moving the said wheel engaging portions with relation to the truck and into engagement with the vehicle wheels for elevating the vehicle and supporting the same by means of said truck, driving mechanism for propelling the truck, and means for changing the direction of movement of the truck while the directions of movement of the said wheel engaging portions with respect to the truck remain constant.

18. An apparatus for handling vehicles, said apparatus embodying a truck like structure, operating mechanism for propelling the truck, vehicle wheel engaging portions movable with and with respect to the truck, operating mechanism for moving the said wheel engaging portions into engagement with the vehicle wheels for raising the vehicle and supporting the same by means of the truck, power mechanism common to both of the said operating mechanisms for actuating them, and means for selectively controlling the said operating mechanisms.

19. A self contained portable apparatus for handling vehicles embodying a truck like structure, operating mechanism for propelling the truck, vehicle wheel engaging portions movable with and with respect to the truck, operating mechanism for moving the said wheel engaging portions into engagement with the vehicle wheels for raising the vehicle and supporting the same by means of the truck, power mechanism common to both of the said operating mechanisms for actuating them, and means for selectively controlling the said operating mechanisms.

20. A portable apparatus for handling vehicles embodying a truck like structure, propelling means for the truck, means carried by the truck for movement therewith and with respect thereto and adapted to engage the peripheries of the vehicle wheels for elevating the vehicle and supporting the same from the truck, and means for changing the direction of movement of the truck, the last recited means embodying provisions adapting a portion of the truck for rotation about its own axis.

21. A portable apparatus for handling vehicles embodying a truck like structure, propelling means for the truck, means carried by the truck for movement therewith and with respect thereto and adapted to engage the peripheries of the vehicle wheels for elevating the vehicle and supporting the same from the truck, means for changing the direction of movement of the truck, the last recited means embodying provisions adapting a portion of the truck for rotation about its own axis, and means for selectively controlling the said propelling means and the direction of movement changing means.

22. A portable apparatus for handling vehicles embodying a truck like structure, propelling means for the truck, means carried by the truck for movement therewith and with respect thereto and adapted to engage the peripheries of the vehicle wheels for elevating the vehicle and supporting the same from the truck, means for changing the direction of movement of the truck, the last recited means embodying provisions adapting a portion of the truck for rotation about its own axis, and mechanism embodying means common to all of the aforesaid means for selectively controlling them.

23. A portable apparatus for handling vehicles embodying a truck like structure, propelling means for the truck, means carried by the truck for movement therewith and with respect thereto and adapted to engage the peripheries of the vehicle wheels for elevating the vehicle and supporting the same from the truck, means for changing the direction of movement of the truck, the last recited means embodying provisions adapting a portion of the truck for rotation about its own axis, power mechanism mounted upon the truck, and means for selectively connecting all of the aforesaid means with the said power mechanism.

24. An apparatus for handling vehicles embodying a truck like structure, opposed pairs of vehicle wheel engaging means connected with the truck for movement therewith and with respect thereto, and means operating to separate the wheel engaging means of the respective pairs and force them into contact with the peripheries of the respective wheels of the vehicle wheels and thereby elevate the vehicle from the supporting surface and support the vehicle from the truck.

25. An apparatus for handling vehicles embodying a truck like structure, opposed pairs of vehicle wheel engaging means connected with the truck for movement therewith and with respect thereto, means operating to separate the wheel engaging means of the respective pairs and force them into contact with the peripheries of the respective wheels of the vehicle wheels and thereby elevate the vehicle from the supporting surface and support the vehicle from the truck, power mechanism for propelling the truck, and means for operatively connecting the said power mechanism with the said vehicle wheel engaging means at will.

26. The method of storing motor vehicles in a building which consists in providing a plurality of vehicle storage spaces, then positioning the vehicles adjacent the storage spaces on the floor or ground and then bodily moving the vehicles laterally from such position and into the said space.

27. The method of storing motor vehicles in a building which consists in providing a plurality of vehicle storage spaces, then positioning the vehicles adjacent the storage spaces and within a driveway extending past said spaces, and then bodily moving the vehicles laterally from the driveway and into the spaces so that the length of the vehicles will extend in a general direction lengthwise of the driveway.

28. The method of storing motor vehicles in a building which consists in providing a plurality of vehicle storage spaces, then successively positioning the vehicles adjacent opposed storage spaces and within a driveway extending past said storage spaces, and then bodily moving the vehicles laterally from the driveway into either of said storage spaces so that the length of the vehicles in said spaces will extend in a general direction lengthwise of the driveway.

29. The method of storing motor vehicles in a building which consists in providing a plurality of vehicle storage spaces, then successively positioning the vehicles adjacent opposed storage spaces and within a driveway extending past said storage spaces, and then bodily moving the vehicles laterally from the driveway into either of said storage spaces, the vehicles in the respective spaces being arranged side by side and being positioned in the spaces so that the length of all of the vehicles will extend in a general direction lengthwise of the driveway.

30. The method of storing motor vehicles in a building involving a storage section with a driveway extending along said section at one edge thereof, which consists in providing a plurality of vehicle storage spaces, then successively and bodily moving the vehicles laterally from the driveway and into the storage space and arranging the vehicles side by side in said space while the position of the length of the vehicles with respect to the general direction of the length of the driveway remains substantially unchanged.

Signed at Chicago county of Cook and State of Illinois, this 10th day of August 1922.

FREDERICK P. DINKELBERG.